(12) United States Patent  
Baba et al.

(10) Patent No.: US 8,027,978 B2  
(45) Date of Patent: Sep. 27, 2011

(54) IMAGE SEARCH METHOD, APPARATUS, AND PROGRAM

(75) Inventors: Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP); Shigemi Nagata, Kawasaki (JP); Rujie Liu, Beijing (CN); Dai Miyawaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 330 days.

(21) Appl. No.: 12/039,357

(22) Filed: Feb. 28, 2008

(65) Prior Publication Data

US 2008/0222113 A1 Sep. 11, 2008

(30) Foreign Application Priority Data

Mar. 9, 2007 (JP) ................. 2007-060897

(51) Int. Cl.
*G06F 7/00* (2006.01)
*G06F 17/30* (2006.01)
(52) U.S. Cl. ................. 707/736; 707/915
(58) Field of Classification Search .......... 707/736, 707/915, 999.006
See application file for complete search history.

(56) References Cited

U.S. PATENT DOCUMENTS

| | | | | |
|---|---|---|---|---|
| 5,787,196 A | * | 7/1998 | Yair et al. | 382/178 |
| 2001/0056419 A1 | | 12/2001 | Lee | |
| 2003/0021481 A1 | * | 1/2003 | Kasutani | 382/218 |
| 2004/0105594 A1 | * | 6/2004 | Blake et al. | 382/266 |
| 2006/0197763 A1 | * | 9/2006 | Harrison et al. | 345/441 |

FOREIGN PATENT DOCUMENTS

| | | |
|---|---|---|
| CN | 1207532 | 2/1999 |
| JP | A 11-15959 | 1/1999 |

OTHER PUBLICATIONS

Takayuki Baba, et al., "A shape-based part retrieval method for mechanical assembly drawings," Technical Report of IEICE, PRMU2004-225, pp. 79-84, Mar. 2005.

Rujie Liu, et al., "Attributed Graph Matching based Engineering Drawings Retrieval," Proc. of IAPR Workshop on Document Analysis Systems (DAS04), pp. 378-385, Sep. 2004.

Rujie Liu, et al., "Component Parts Extraction From Assembly Drawings for Content Based Retrieval," Proc. of the IEE International Conference on Visual Information Engineering: Convergence in Graphics and Vision (VIE2005), pp. 45-50, Apr. 2005.

(Continued)

*Primary Examiner* — Usmaan Saeed
*Assistant Examiner* — Van Oberly
(74) *Attorney, Agent, or Firm* — Greer, Burns & Crain, Ltd.

(57) ABSTRACT

According to an aspect of an embodiment, a method for searching image data representing an image from a database by using a query image, the image data including information indicative of a shape of a contour of the image, comprising: obtaining a query image data representing the query image; extracting information indicative of a shape of a contour of the query image; and determining the image data in the database on the basis of correlation of the topological characteristics of the shapes of the contours of the images and the query image.

3 Claims, 10 Drawing Sheets

OTHER PUBLICATIONS

Takayuki Baba, et al., "Similarity-based Partial Image Retrieval System for Engineering Drawings," Proc. of Seventh IEEE International Symposium on Multimedia (ISM2005), pp. 303-309, Dec. 2005.

Heinz Breu, et al., "Linear Time Euclidean Distance Transform Algorithms," IEEE Transactions on Pattern Analysis and Machine Intelligence, vol. 17, No. 5, pp. 529-533, May 1995.

Rujie Liu, et al., "Shape Similarity Based on Contour Decomposition and Correspondence," Proc. of the 8$^{th}$ International Conference on Signal Processing (ICSP2006), pp. 1015-1018, Nov. 2006.

Rujie Liu, et al., "Device Parts Retrieval from Assembly Drawings with SVM based Active Relevance Feedback," Proc. of ACM International Conference on Image and Video Retrieval (CIVR2007), Jul. 2007.

Rujie Liu, "SVM-based Active Feedback in Image Retrieval using Clustering and Unlabeled Data," Proc. of the 12$^{th}$ International Conference on Computer Analysis of Images and Patterns (CAIP2007), pp. 1-8, Aug. 2007.

* cited by examiner

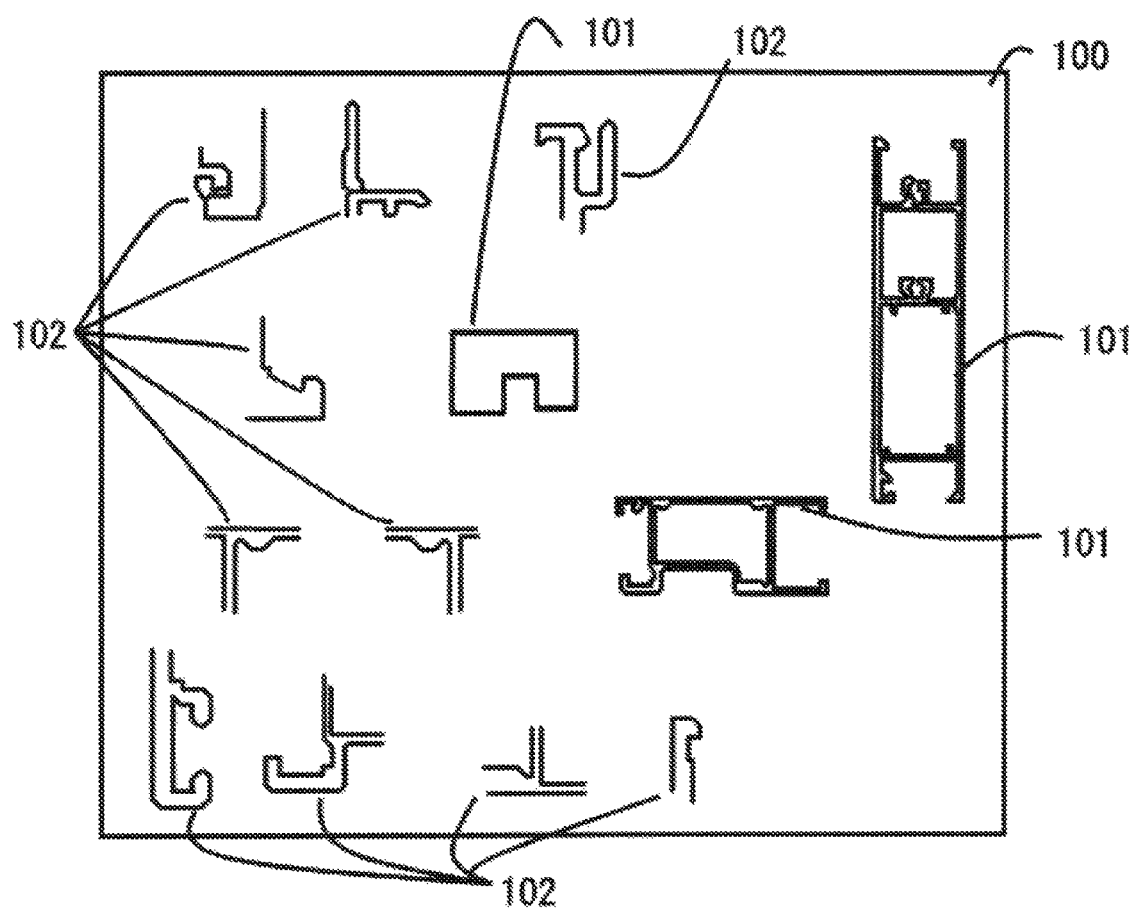

IMAGE SEARCH METHOD, APPARATUS, AND PROGRAM

TECHNICAL FIELD

The present embodiment relates to methods, apparatuses, and programs for searching for images.

In the field of image searches, there is a technique for searching for desired images using text information that is associated with images. There is also a technique for searching for images similar to desired images which are difficult to express as text, on the basis of the shapes of the desired images. A technique related to the above techniques is disclosed in Japanese Unexamined Patent Application Publication No. H11-15959.

In assembly drawings for machine products, a plurality of pieces of image data of machine parts may be shown in a piece of drawing data. Drawing data may include image data of an enlarged image of a portion of a part. Such drawing data is called detailed image data. When image data of a machine part image contained in the drawing data is searched for, detailed image data of a portion of the machine part may not be appropriate to be included in search results. Thus, it is desirable to exclude detailed image data from the search results.

The search technique in which data of images having shapes similar to the shape of desired images is searched for takes time due to operations to be performed for the search for similar images. In addition, this technique has a problem of low search precision, in which data of a detailed image of a desired part image may be retrieved as data of a similar part image.

SUMMARY

According to an aspect of an embodiment, a method for searching image data representing an image from a database by using a query image, the image data including information indicative of a shape of a contour of the image, comprising: obtaining a query image data representing the query image; extracting information indicative of a shape of a contour of the query image; and determining the image data in the database on the basis of correlation of the topological characteristics of the shapes of the contours of the images and the query image.

BRIEF DESCRIPTION OF THE DRAWINGS

FIG. 10 illustrates an example of drawing data input in an embodiment of the present embodiment.

DESCRIPTION OF THE PREFERRED EMBODIMENTS

Figure 1:
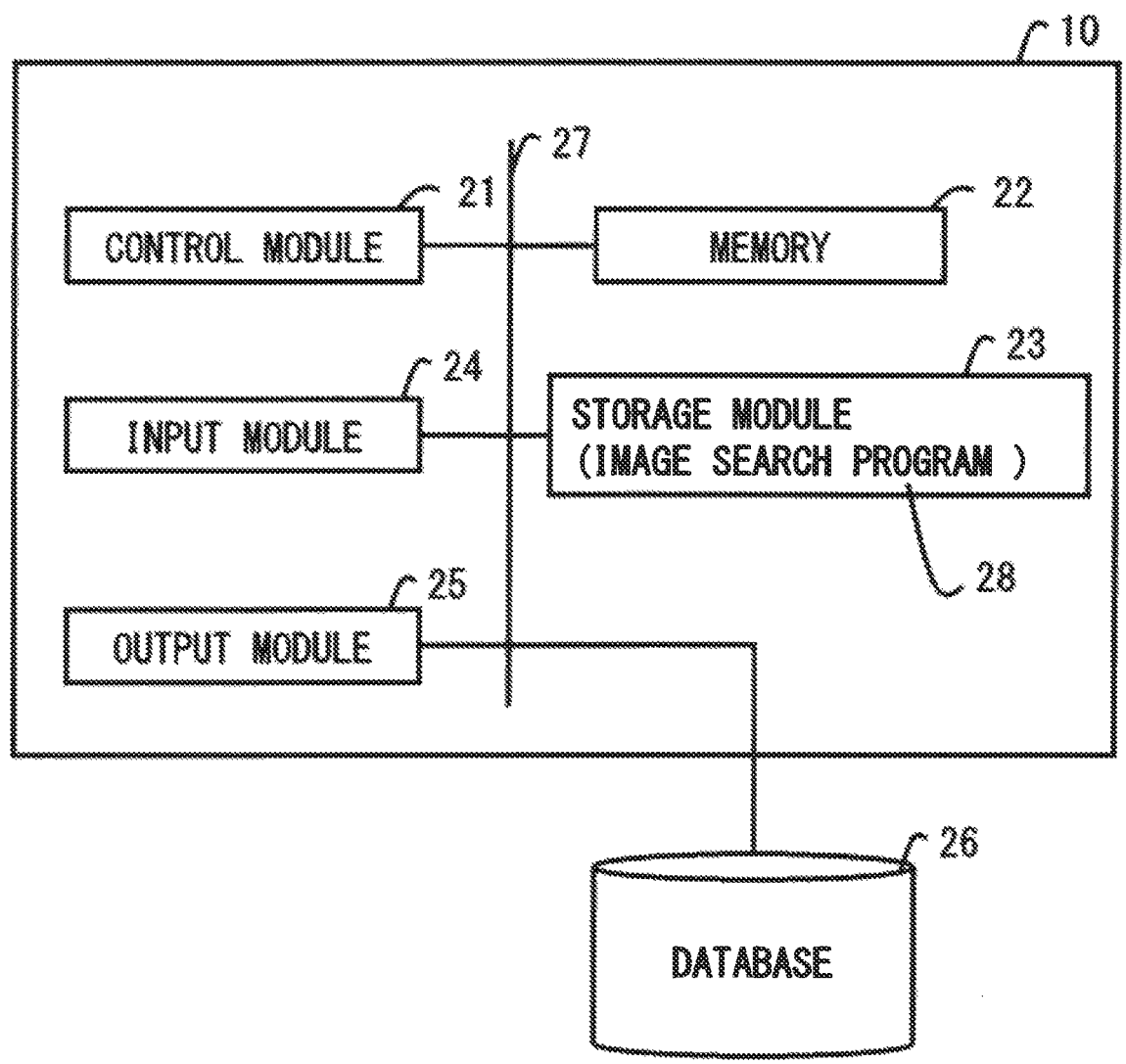
FIG. 1 illustrates a hardware configuration according to an embodiment of the present embodiment.

Accordingly, there is a need for an image search apparatus for accurately searching for images similar to a desired image to be searched for.

According to an aspect of the present embodiment, there is provided an image search method for an image search apparatus configured to search for image information stored in a database. The image search method includes the steps of detecting attribute information of image information to be searched for in accordance with a search request, on the basis of the shape of the outline of an image corresponding to the image information to be searched for, reading from the database, in which image information and attribute information are stored so as to be associated with each other, image information of which the attribute information matches the attribute information of the image information to be searched for, and searching for image information in the database in which a difference between a value set from the image information read from the database and a value set from the image information to be searched for is equal to or less than a predetermined value.

According to an aspect of the present embodiment, in the above image search method, the attribute information is information obtained as a result of determination as to whether or not the outline of an image has a closed shape.

According to an aspect of the present embodiment, the method further includes the steps of, when a plurality of image objects are present in a drawing, dividing the drawing into image areas each having an image object, storing the plurality of the divided image areas in a database, and searching for a drawing having image information in which a difference between a value set from image information corresponding to one of the image objects and a value obtained from image information corresponding to an image object to be searched for in accordance with a search request is equal to or less than a predetermined value.

According to an aspect of the present embodiment, in the image search method, it is determined whether or not an image area includes a closed region on the basis of the relationship between position information relating to the outline of an image object in the image area and position information relating to a skeleton obtained from the image object.

According to an aspect of the present embodiment, in the above image search method, when it is determined whether an image area includes a closed region, the ratio of the number of overlapping pixels between pixels constituting an image object in the image area and pixels constituting the skeleton of the object, to the number of pixels constituting the outline of the object is calculated. When the calculated ratio exceeds a predetermined threshold, the object is determined to have an open region.

According to the present embodiment, since a database in which attribute information of an image is stored so as to be associated with the image is provided, only image information in the database of which the attribute information matches attribute information associated with a desired image object to be searched for can be searched. As a result, image information having attribute information different from the attribute information associated with the image object to be searched for is not retrieved as a similar image. This enables a search for similar drawings to be performed with accuracy. In addition, since, the images to be searched for can be narrowed down, the number of images on which similarity calculation is to be performed can be reduced. This reduces the time required for the similarity calculation.

In the following, the preferred embodiments of the present disclosure will be described.

FIG. 1 illustrates a hardware configuration according to an embodiment of the present disclosure, in which an image search apparatus 10 has a control unit 21, a memory 22, a storage unit 23, an input unit 24, and an output unit 25 which are interconnected via a bus 27.

The control unit 21 may be, for example, a central processing unit (CPU) for controlling the entire image search apparatus 10. The control unit 21 executes an image search program 28 stored in the memory 22. The image search program 28 causes the control unit 21 to function as an image dividing module, an open/closed part determining module, feature amount calculating module, and a similar image searching module. The image dividing module can divide input drawing data into pieces of data of part images. The open/closed part determining module can determine whether each of the part images has a region of an open shape or a region of a closed shape. The feature amount calculating module can acquire a value specific to the individual part image data. The similar image searching module can acquire a value representing the degree of similarity between the individual part images and output the acquired value. For simplicity of the following description, these operations of the modules are described as being performed by the control unit 21. In addition, hereinafter, drawing data, image data, etc. can simply be referred to as a drawing, an image, etc., respectively.

The memory 22 is a storage area on which the image search program 28 is expanded. The memory 22 also serves as a storage area for storing various operation results generated while the control unit 21 executes the image search program 28. The memory 22 may be, for example, a random access memory (RAM).

The input unit 24 receives from a user image information on the basis of which a search is performed (hereinafter referred to as query image information or as a query image). The input unit 24 may include, for example, a keyboard, a mouse, and a touch panel. The output unit 25 outputs results of the search with the query image information.

The output unit 25 may be, for example, a display. The storage unit 23 stores the image search program 28. The storage unit 23 may be, for example, a hard disk device.

Figure 2:
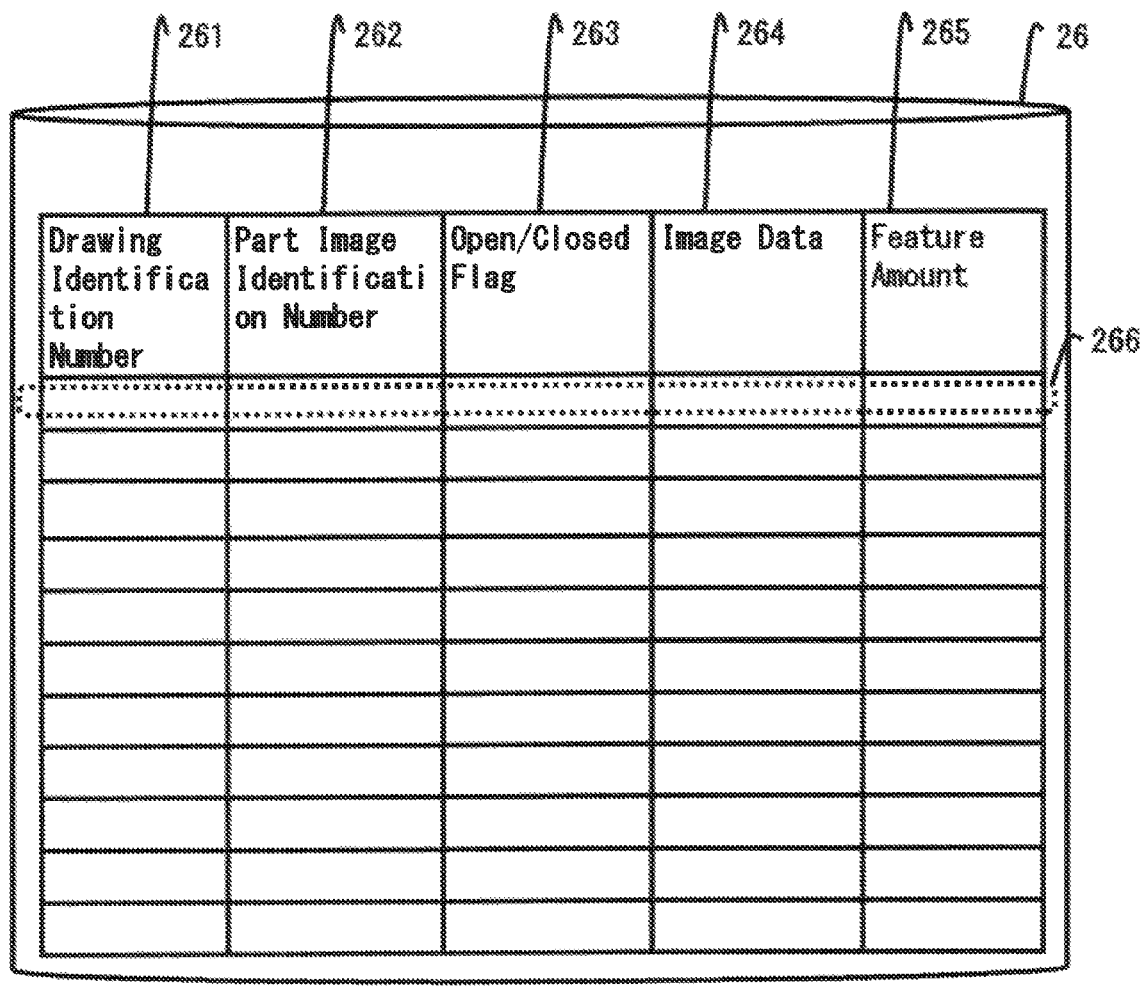
FIG. 2 illustrates a structure of a database according to an embodiment of the present embodiment.

In the following, a description of a database 26 to be connected to the image search apparatus 10 will be provided. FIG. 2 illustrates an example of a structure of a database 26 according to an embodiment of the present disclosure. The database 26 stores sets of image data to be searched. In the present embodiment, objects to be searched are drawings of machine parts included in drawings. A drawing may include a plurality of drawings of machine parts, as in the case of an assembly drawing, for example. In the present embodiment, drawings of parts contained in a drawing, such as images 101 and 102 shown in FIG. 10, (hereinafter referred to as part images) are stored in the database 26.

The database 26 stores records 266 for individual part images. Each of the records 266 includes a drawing identification number 261, a part image identification number 262, an open/closed flag 263, image data 264, and a feature amount 265.

The drawing identification number 261 is a number for identifying a drawing to which a part image originally belongs. The open/closed flag 263 stores a result of determination as to whether the outline of each part image forms an open region or a closed region. Hereinafter, a part image having a region of an open shape is referred to as a part image of open region type, and a part image having a region of a closed shape is referred to as a part image of closed region type. Type is determined by a topological characteristic of a shape of a contour of an image. The part image data 264 is image data of a part image. The feature amount 265 is a value specific to an image which is calculated from the image. The feature amount 265 is used when similar images are searched for, which will be described below.

Figure 3:
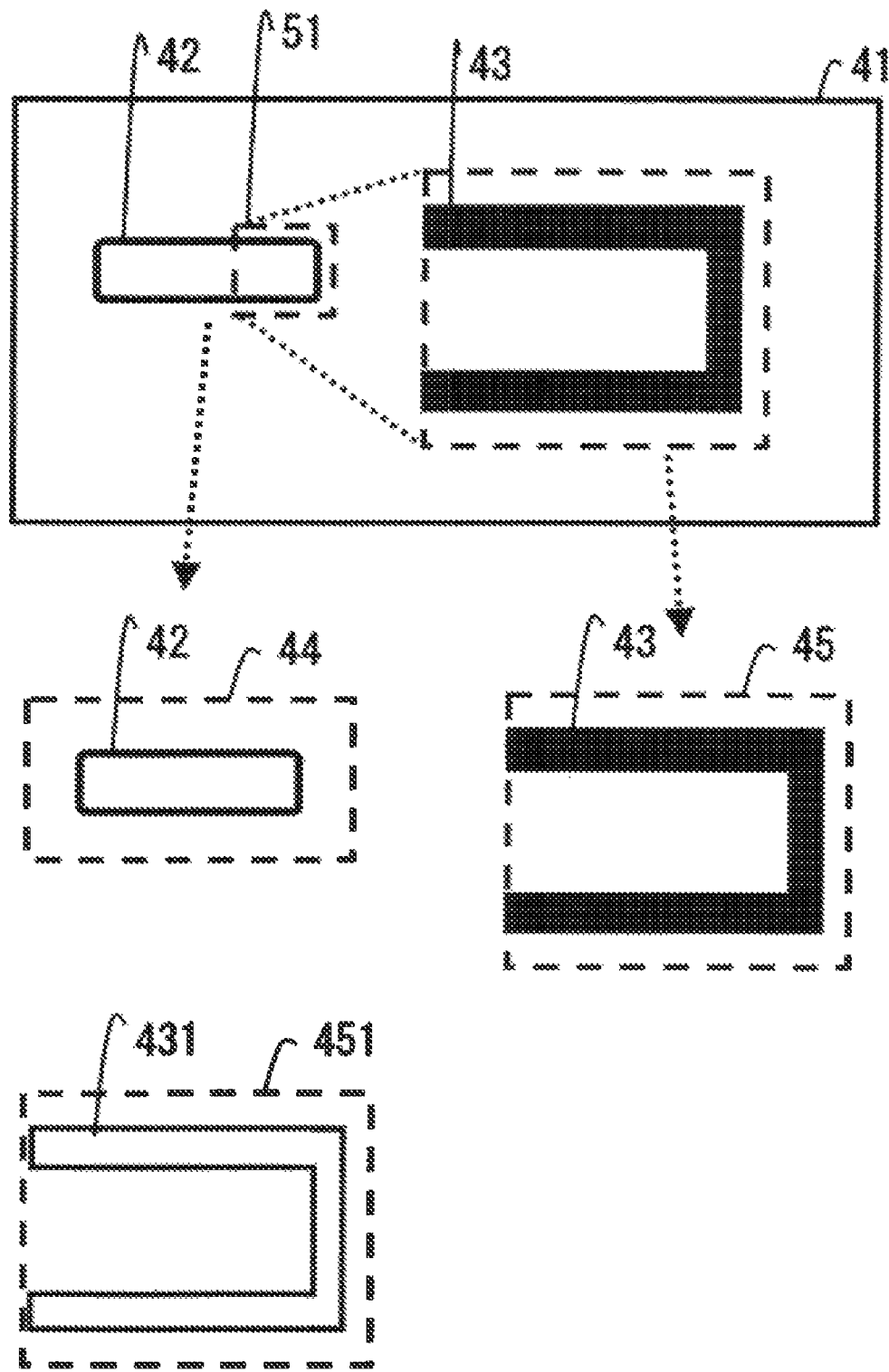
FIG. 3 illustrates part images of open region type and a part image of closed region type.

FIG. 3 illustrates a part image of open region type and a part image of closed region type according to an embodiment of the present disclosure. In an assembly drawing or the like, a portion of a part image in the drawing which needs special attention may be cut and enlarged to facilitate viewers' understanding of the characteristics of the part. The enlarged image of the portion of the part which needs special attention may be used along with a detailed description.

In FIG. 3, a drawing 41 includes a part image 42 and a part image 43 which is an enlarged image of a portion 51 of the part image 42. The part image 42 is herein defined as a part image of closed region type, and the part image 43 is herein defined as a part image of open region type. The part image of closed region type has a closed outline. In the case of such a part image having a closed outline, an area in a drawing that is occupied with the part image (the part image 42 in this case) can be determined by the outline of the part image. On the other hand, the part image of open region has an open outline. In the case of such a part image having an open outline, it is not possible to determine an area in a drawing that is occupied with the part image (the part image 43 in this case) by the outline of the part image. The drawing 41 can be divided into a part image area 44 containing the part image 42 and a part image area 45 containing the detailed image 43.

In addition, FIG. 3 shows an image area 451 containing a part image 431. The part image 431 has the same shape as the part image 43. However, the entire detailed image 43 consists of the outline, and thus the detained image 43 is a part image of open region type. On the other hand, the part image 431 has a region in the interior of the outline which serves as a part, and thus the part image 431 is a part image of closed region type. Accordingly, although the part image 431 and the detailed image 43 have the same shape, these images are stored in the database 26 as having different attributes.

In the following, referring to a flowchart in FIG. 5, a processing procedure performed by the control unit 21 to register a part image in the database 26 according to an embodiment of the present disclosure will be described.

At Step S01, the control unit 21 acquires drawing data to be registered in the database 26. In order to acquire the drawing data, an image on a paper may be converted into an image in an electronic form using a scanner. It is also possible to read the drawing data via a network or from a storage medium. When a plurality of part images are contained in the drawing, the control unit 21 divides the drawing data into part image data portions, so that the database 26 stores records in units of part images.

Figure 6:
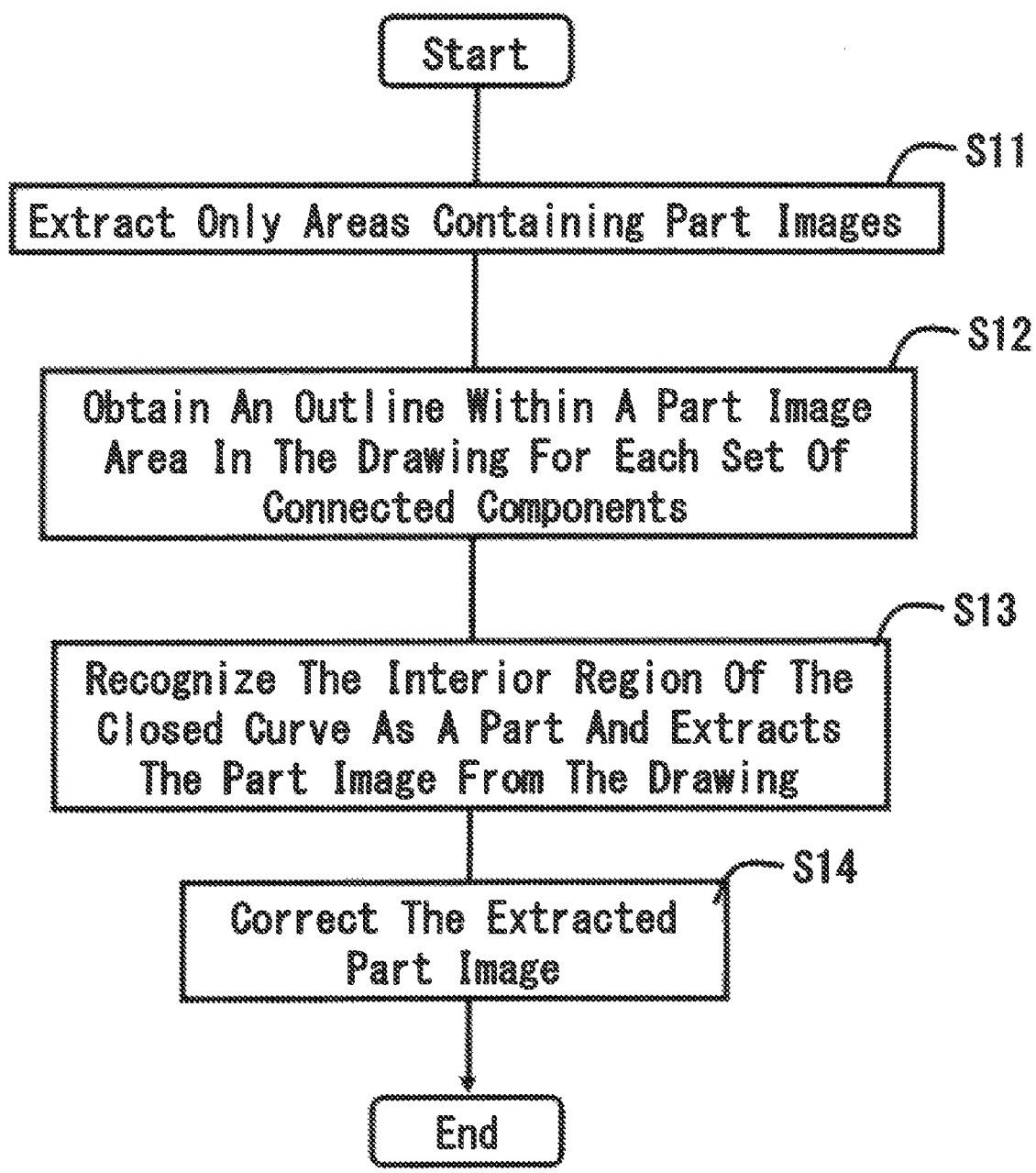
FIG. 6 is a flowchart illustrating processing of dividing a drawing into part images according to an embodiment of the present embodiment.

Now, a techniques used for dividing drawing data (a drawing) will be briefly described. FIG. 6 is a flowchart illustrating a processing procedure performed when a drawing is divided into part images. At Step S11, the control unit 21 removes, from the drawing, areas in which text information or the like is recorded, which are unnecessary for the processing, and extracts only areas containing part images. After removing the unnecessary areas, the control unit 21 divides the drawing into part image areas. At this time, the control unit 21 extracts the outlines of the part images and divides the drawing into the individual part image areas on the basis of the outlines.

At Step S12, the control unit 21 obtains an outline within a part image area in the drawing for each set of connected components. As a result, the control unit 21 obtains a closed curve constituting the outline. Then, at Step S13, the control unit 21 recognizes the interior region of the closed curve as a part and extracts the part image from the drawing.

Subsequently, at Step S14, the control unit 21 corrects the extracted part image as necessary. For example, there may be a case where two part images are erroneously recognized as one part image when auxiliary lines of the two part images intersect with each other. In such a case, the control unit 21 defines such images as two part images by removing the auxiliary lines. For example, utilizing the fact that an auxiliary line has a small line width, the control unit 21 executes processing in which a line whose width is less than a predetermined value is removed and then the division of the drawing is performed. The control unit 21 performs the above processing procedure on every part image in the drawing.

Figure 5:
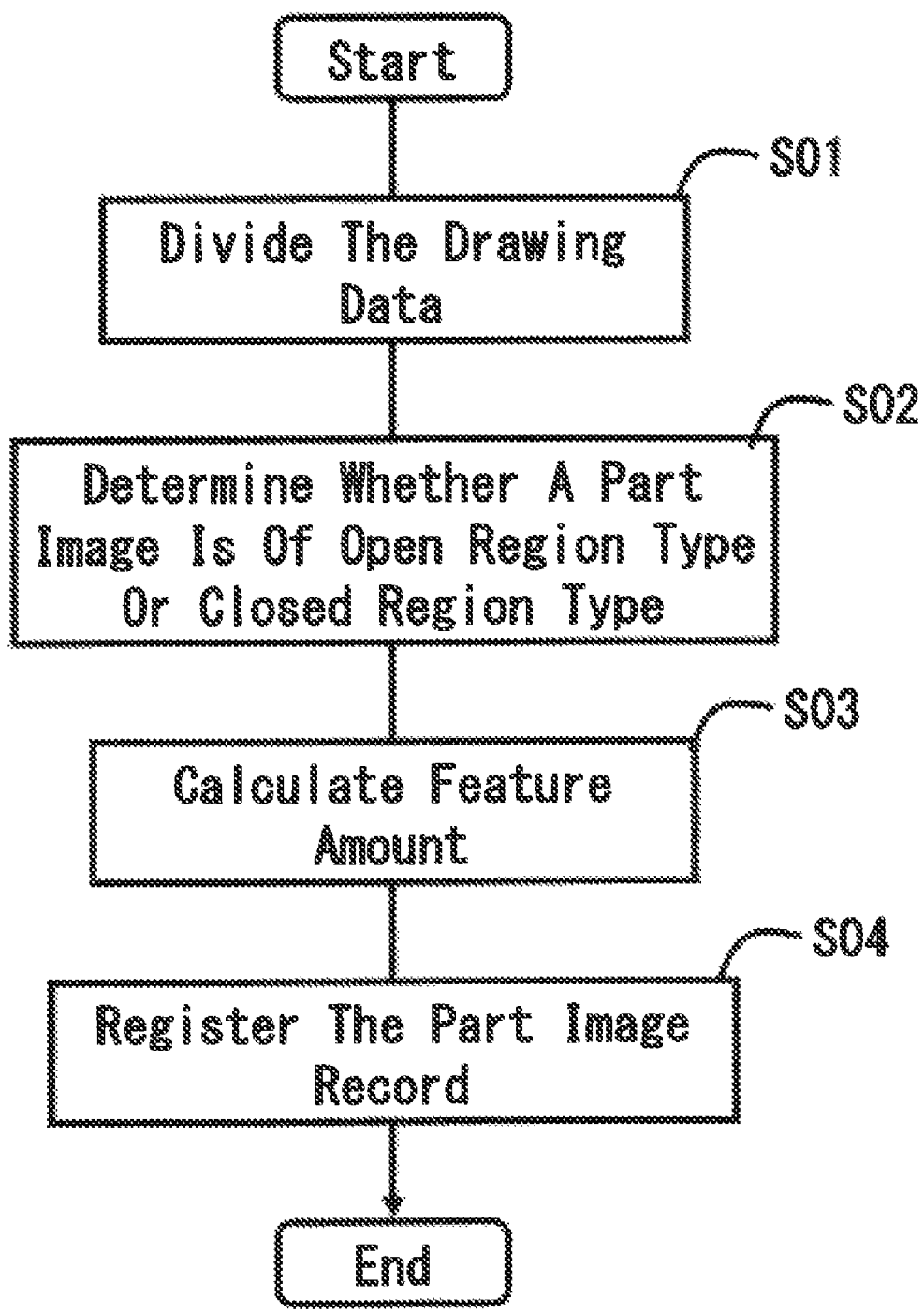
FIG. 5 is a flowchart illustrating processing of registering a part image in a database according to an embodiment of the present embodiment.

Referring back to the flowchart in FIG. 5, at Step S02, the control unit 21 determines whether each of the part images is of closed region type or open region type. In the present embodiment, this determination is performed on the basis of a skeleton of an image object.

Figure 7:
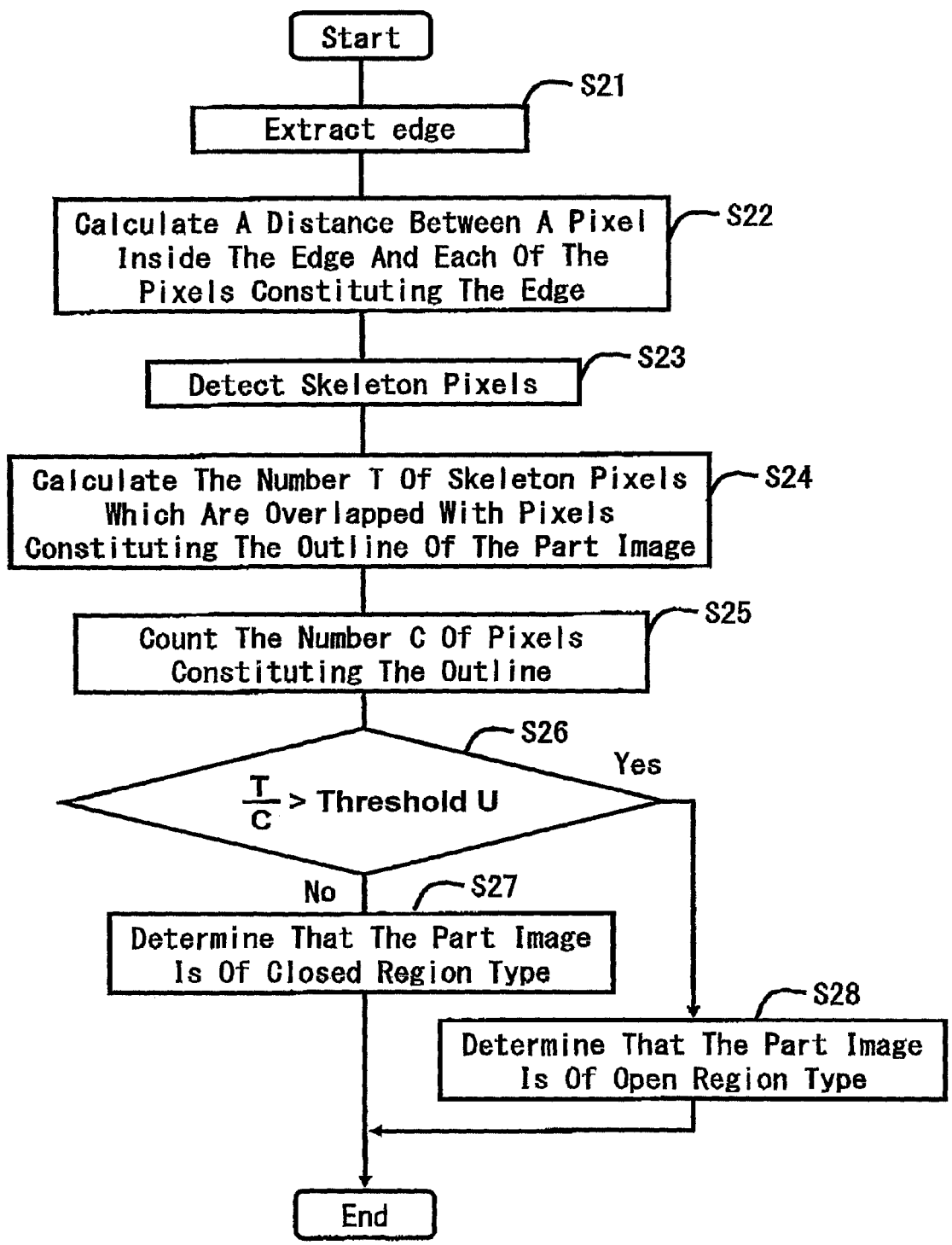
FIG. 7 is a flowchart illustrating processing of determining whether a part image is of open region type or closed region type according to an embodiment of the present embodiment.
Figure 8:
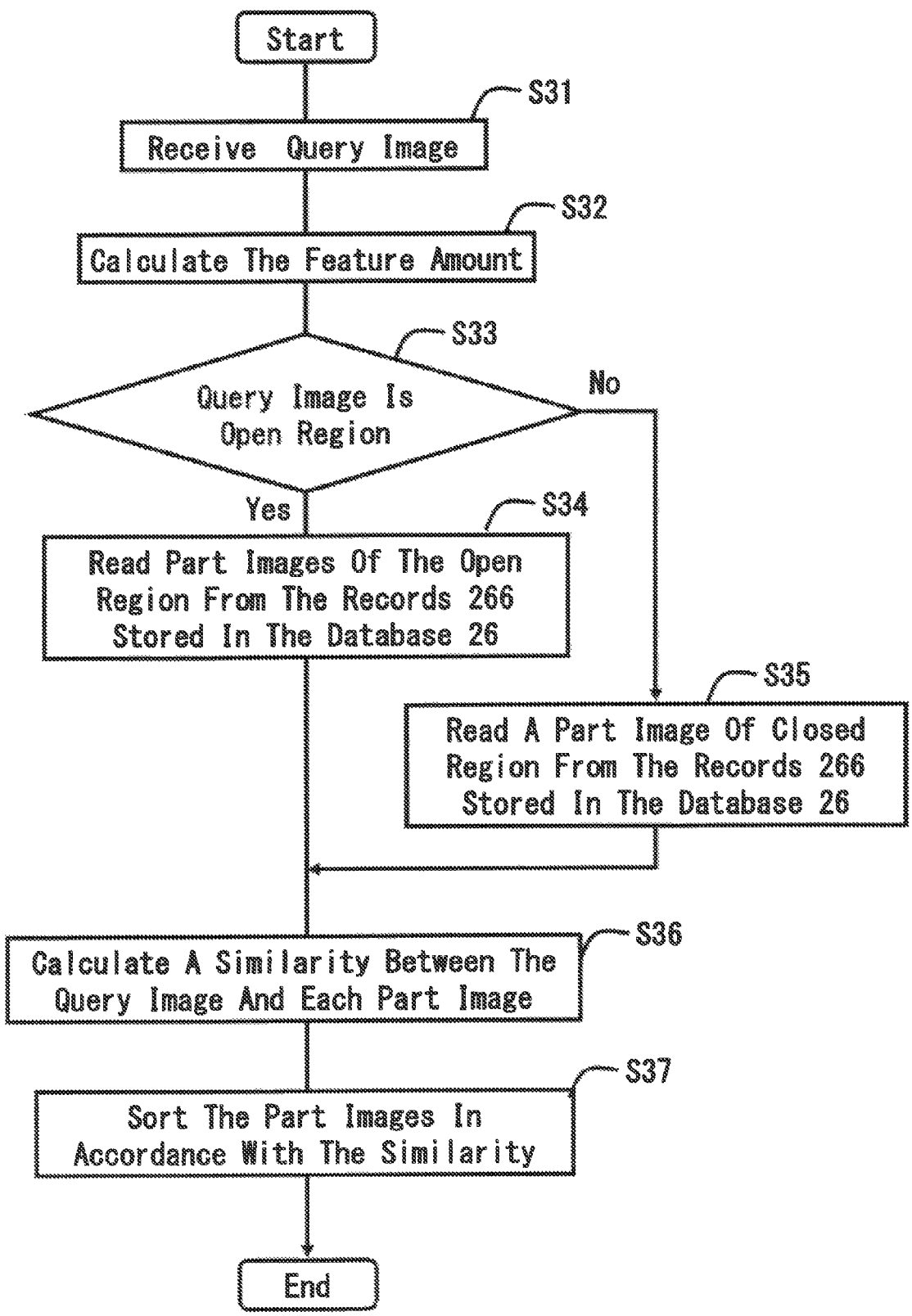
FIG. 8 is a flowchart illustrating image search processing according to an embodiment of the present embodiment.

Now, the above determination as to whether each part image is of open region type or closed region type will be described in more detail. FIG. 7 is a flowchart illustrating a processing procedure of the determination. At Step S21, the control unit 21 extracts a line constituting the outer periphery of a line constituting the shape of the part image (outline). Such an outer peripheral line is herein referred to as an edge. For example, pixels in an image are binarized into pixels representing a background (background pixels) and pixels representing an image object (object pixels), and the outer periphery of a region composed of the object pixels is calculated. This outer periphery is regarded as the edge. The outline is a region in which object pixels are connected with each other along the edge.

At Step S22, the control unit 21 calculates a distance between a pixel inside the edge and each of the pixels constituting the edge. The control unit 21 performs this calculation for each pixel inside the edge. At Step S23, the control unit 21 detects pixels, from among the pixels inside the edge which are located at the greatest distance from the pixels constituting the edge (skeleton pixels). At Step S24, the control unit 21 calculates the number T of skeleton pixels which are overlapped with pixels constituting the outline of the part image.

The determination as to whether each part image is of open region type or closed region type can also be performed on the basis of the width of the outline of the part image. When variation in the width of the outline of the part image is added to criteria for the determination, a pixel to be counted in T has to be a skeleton pixel that is overlapped with the outline of the part image and is defined as being located at a distance smaller than a predetermined threshold distance L from every pixel constituting the outline.

Then, at Step S25, the control unit 21 counts the number C of pixels constituting the outline. At Step S26, the control unit 21 compares the ratio of T to C and a predetermined threshold U. The threshold U can be appropriately adjusted in accordance with the type or the like of a part image stored in the database 26.

The threshold U can be determined taking into account the following conditions. The number of pixels constituting the edge of a part image is twice the number of skeleton pixels. The difference between the number of skeleton pixels and the number of pixels constituting the edge increases with increasing size of the interior region of the outline of the part image. On the other hand, the number of pixels constituting the edge becomes closer to the twice the number of skeleton pixels as the size of the interior region of the outline of the part image decreases. Thus, when the number T of skeleton pixels, which are included in the pixels constituting the outline of the part image, is large and thus the number of pixels constituting the edge of the part image is close to twice the number of skeleton pixels, it can be determined that the skeleton pixels are likely to be present on the outline.

When the ratio of T to C is less than the predetermined threshold U (No, in Step S26), the control unit 21 determines that the part image is of closed region type at Step S27. When the ratio of T to C is equal to or greater than the threshold U (Yes, in Step S26), the control unit 21 determines that the part image is of open region type at Step S28.

Figure 4:
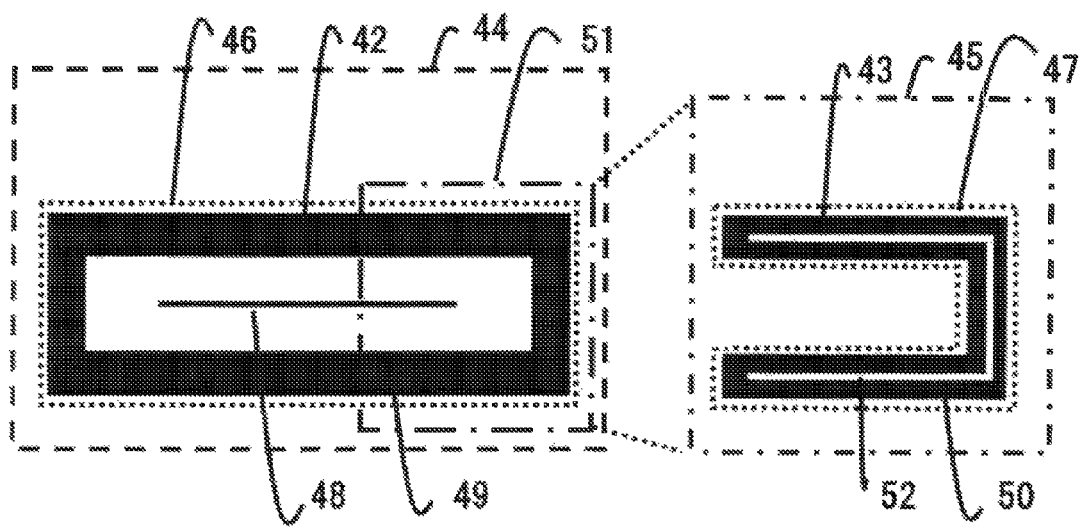
FIG. 4 illustrates a difference in characteristics between a part image of open region type and a part image of closed region type.

FIG. 4 illustrates a difference between characteristics of a part image of closed region and a part image of open region. In FIG. 4, the part image 42 is drawn in the part image area 44, and the part image 43 is drawn in the part image area 45. The outline (contour) of the part image 42 is indicated by a solid line 49. The solid line 49 forms a closed region within the part image area 44. The closed region inside the solid line 49 is a region representing a part and thus is not a background. The part image 43 is a detailed image of the portion 51 of the part image 42. Therefore, in the part image 43 only a region indicated by a solid line 50 is regarded as a part.

In the following, a technique for determining whether each of the part image 42 and the part image 43 is of closed region type or open region type will be described. The control unit 21 acquires the outlines and edges of the part image 42 and the part image 43. In FIG. 4, the edge of the part image 42 is indicated by a line 46, and the edge of the part image 43 is indicated by a line 47.

The control unit 21 acquires skeleton pixels 48 using the edge 46 of the part image 42 and skeleton pixels 52 using the edge 47 of the part image 43. In FIG. 4, the skeleton pixels 52 of the part image 43 are indicated by a region indicated by a white line.

The control unit 21 calculates the number T1 of pixels that are the skeleton pixels 43 and are also black pixels inside of the edge 46 of the part image 42. The control unit 21 calculates the number T2 of pixels that are skeleton pixels 52 and are also black pixels inside of the edge 47 of the part image 43. In addition, the control unit 21 calculates the number C1 of pixels constituting the outline of the part image 42 and the number C2 of pixels constituting the outline of the part image 43.

Then, the control unit 21 determines whether the ratio of T1 to C1 is equal to or greater than a predetermined threshold U. When the ratio is less than the threshold U, the control unit 21 determines that the part image 42 is of closed region type. The control unit 21 determines whether or not the ratio of T2 to C2, is equal to or greater than the threshold U. When the ratio is less than the threshold U, the control unit 21 determines that the part image 43 is of open region type.

Figure 11:
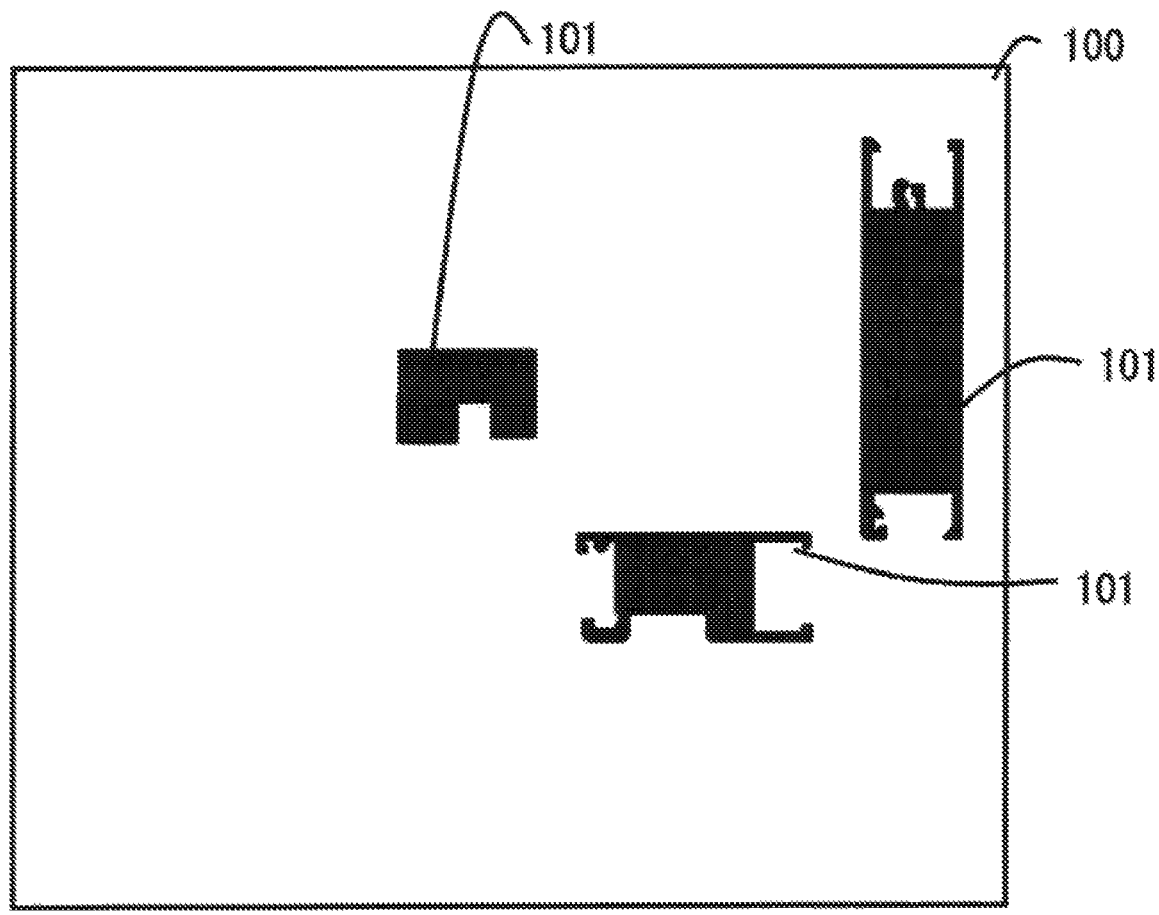
FIG. 11 illustrates a part image detected as part image data of an open region type from drawing data in an embodiment of the present embodiment.

FIG. 10 illustrates an example of input drawing data 100 in the present embodiment. FIG. 11 illustrates examples of part images which are detected as image data of parts having open regions from among images in the drawing data 100. The drawing data 100 in FIG. 10 represents, for example, a single assembly drawing. The drawing data 100 includes three pieces of part image data 101 and ten pieces of detailed image data 102. The part image data 101 of open region illustrated in FIG. 11 can be detected when the control unit 21 performs the determination according to the present embodiment as to whether each image is of open region or closed region.

Referring back to FIG. 5, the control unit 21 calculates the amount of features of a part image. The feature amount is information used for comparison between images when similar images are searched for. In this processing, a feature such, as the color or shape of an object in an image is used. It is also possible to use a feature represented as metadata associated with an image. The feature amount is generally represented by a vector.

In the following, an example of a technique of calculating the feature amount using the color, shape, or the like of an object in an image area. In the present embodiment, the feature amount in the shape of a part image drawn in a divided part image area is expressed using a grid Fourier (GrF) number which is invariant to the position, size, and orientation of the part image in the image area. The GrF feature amount is expressed using polar coordinates taking into account the orientation of the part image.

The control unit 21 binarizes a part image using a predetermined threshold. The control unit 21 normalizes the size of the part image so as to be invariant to the size of the image. Then, the control unit 21 calculates the barycenter of the part image so that the position of the part image is invariant, and sets the barycenter of the part image as the center of the polar coordinates. The control unit 21 divides a part image area into sections defined by concentric lines with its center at the center of the polar coordinates and radial lines extending from the center of the polar coordinates.

The control unit 21 counts the numbers of pixels of the part image in the individual divided sections and creates a histogram corresponding to a two-dimensional matrix representing the sections along the angular directions and the radial directions. The control unit 21 performs a two-dimensional Fourier transform on the created histogram so as to be invariant to the orientation of the part image and arranges amplitudes corresponding to frequencies in vector form. With the technique described above, the control unit 21 sets information in vector form as the feature amount of a part image.

At Step S04, the control unit 21 can now register in the database 26 the drawing identification number 261, the part image identification number 262, the open/closed flag 263 indicating a value corresponding to the type (open region or closed region) of the part image obtained in the processing of Step S02, the image data 264, and the feature amount 265 calculated in the processing of Step S03, as the record 266. Thus, the control unit 21 can register drawing data in the database 26.

Figure 9:
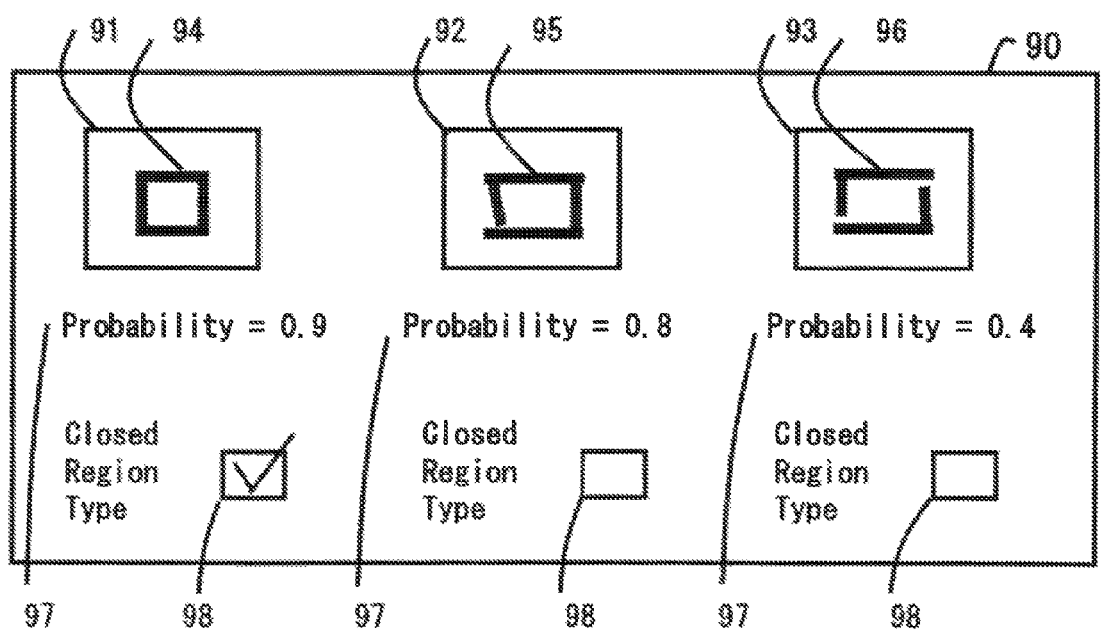
FIG. 9 is an example of a registration screen to be displayed on an output unit according to an embodiment of the present embodiment.

In the following, image search processing performed by the control unit 21 will be described. FIG. 9 is a flowchart illustrating image search processing in accordance with an embodiment of the present disclosure.

At Step S31, the control unit 21 receives image information which is received as a query requesting a search (hereinafter referred to as a query image). In the present embodiment, a query image is one part image.

At Step S32, the control unit 21 calculates the feature amount, of the query image. The feature amount can be obtained by a technique similar to the one used in the processing of Step S03 in FIG. 5. At Step S33, the control unit 21 determines whether or not the query image is of open region using a technique similar to the one used in the processing of Step S02.

If the query image is determined to be of open region (Yes, in Step S33), the control unit 21 reads part images of the open region from the records 266 stored in the database 26 at Step S34. Specifically, the control unit 21 reads a record in which the open/closed flag 263 indicates a part image of open region, from among the records 266 stored in the database 26.

On the other hand, if the query image is of closed region (No, in Step S33), the control unit 21 reads a part image of closed region from the records 266 stored in the database 26 at Step S35. Specifically, the control unit 21 reads a record in which the open/closed flag 263 indicates a part image of closed region type, from among the records 266 stored in the database 26.

At Step S36, the control unit 21 calculates a similarity between the query image acquired in Step S32 and each part image contained in the records 266 which have been read in the processing Step S34 or 335. For example, the control unit 21 calculates a matching value between a feature amount vector of the query image and a feature amount vector of the part image contained in each of the records 266 read out in Step S34 or S35. Such a matching value may be expressed using a Euclidean distance. For example, the matching value may be the sum square of the difference between elements in the individual feature amount vectors.

At Step S37, the control unit 21 sorts the part images in accordance with the similarity calculated in Step S36 and rearranges part images reads in Step S34 or S35 in order from the most similar to the least similar. The control unit 21 reads the drawing identification number 261 corresponding to the part image data 264 and outputs the part images as the search results. Thus, the control unit 21 performed the search processing through the procedure described above.

As described above, in the search processing on the basis of the query image, part images are sorted in advance into part images of open region and part images of closed region and the part images that are not to be searched are excluded. This can reduce the number of part images on which the similarity calculation is performed. As a result, of the reduction, the time required for the search operation can also be reduced.

In the above embodiment, the control unit 21 classifies the part images into part images of open region type and part images of closed region type. Thus, it is unlikely that part images of closed region type are retrieved as a result of a search with a query image which is of open region type or that part images of open region type are retrieved as a result of a search with a query image which is of closed region type. As a result, the accuracy of a search for similar images is enhanced.

While the above embodiment has been described using an assembly drawing as an example, the embodiment is also applicable to various fields relating to image information such as a search for multimedia information including image information, a search for three-dimensional CAD images, a search for moving images, and a Web search.

In the above embodiment, a technique of determining whether a part image is of open region type or closed region type using the open/closed flag 263 is described. However, other techniques can be employed for the determination. For example, the open/closed flag 263 is not defined as binary (representing the open region type and the closed region type) but set as information indicating a probability of being a part image of open region type or being a part image of closed region type. In this case, a value representing probability of being a part image of open region type, for example, is stored in the open/closed flag 263.

For example, when (T/C−U)>0 is satisfied, the control unit 21 stores in the database 26 a value proportional to (T/C−U) as the probability of being a part image of open region type. On the other hand, when (T/C−U)≦0 is satisfied, the control unit 21 sets the probability of being a part image of open region type to be 0 and stores the value in the database 26.

Then, the control unit 21 performs the processing of Step S33 in a search described above, in which an image object is determined to be a part image of open region type when the probability of being a part image of open region type is equal to or greater than a predetermined threshold.

With the above configuration, the image search apparatus 10 is allowed to determine whether or not an image object is of open region type with high accuracy. For example, when a threshold used for the determination is employed as a parameter that can be input in a search operation, the number of candidate part images to be searched, on which similarity calculation is performed in accordance with image characteristics, can be narrowed down beforehand.

In addition, when it is determined whether a part image is of open region type or closed region type as in the case of processing of Step S02, the control unit 21 can display the probability that the part image to be operated is of open region type.

For example, the control unit 21 displays the probability that a part image to be operated is of open region type on the output unit 25 in conjunction with corresponding drawing data. An operator determines whether or not the part image displayed on the output unit 25 is of open region type and inputs the determination result to the input unit 24. The control unit 21 stores data corresponding to the determination result received via the input unit 24 in the database 26. With this arrangement, the probability of being a part image of open region type is displayed in conjunction with the part image, allowing a person to determine by sight whether a part image is of open region type or closed region type. FIG. 9 illustrates an example of a registration screen displayed on the output unit 25. The output unit 25 displays a registration screen 90, in which part images 94, 95, and 96 to be registered are indicated in the part image areas 91, 92, and 93, respectively. The control unit 21 sets values proportional to (T/C−U) as probabilities 97 of being part images of open region type. In this example, the probabilities 97 that the part images 94, 95, and 96 are of closed region type are indicated as 0.9, 0.8, and 0.4, respectively. The operator determines whether or not each part image displayed on the output unit 25 is of a part image of open region type and inputs a determination result in the input unit 24. This input operation may be, for example, placing a check mark in each of check boxes 98 using a mouse or the like, indicating that a corresponding part image is of closed region type.

In another embodiment, either of part images of open region type or part images of closed region type are searched. An image input as a query image is often an image of an entire part. In this case, the control unit 21 reads records corresponding to part images of closed region type from the database 26 and calculates the similarity for each of the part images. With this configuration, the time required for a search for similar images can further be reduced.

Moreover, it can also be configured such that only part images determined to be of closed region type are registered in the database 26. This reduces the number of data elements to be stored in the database 26, which permits storage of an increased amount of drawing data. In this configuration, either part images of closed region type or part images of open region type are stored.

In the above embodiment, to reduce the time required for a search, the drawing data is divided into part image data portions when the drawing data is registered in the database 26, and corresponding open/closed flag 263 and feature amount 265 are calculated. However, it is also possible that the drawing data is divided into part image data portions when a query image is received, and then the type (open/closed region) of each part image is determined and the corresponding feature amount is calculated. Further, it is possible to register the part images in the database 26 when a search is performed. With this arrangement, the data area for the open/closed flag 263 and the feature amount 265 in the database 26 can be used for storage of other information.

What is claimed is:

1. A method for searching image data representing an image from a database by using a query image, comprising:
   obtaining a query image data representing the query image;
   extracting information indicative of a shape of a contour of the query image and a shape of a skeleton of the query image, the contour constituting an outer edge of the query image, and the skeleton being located at the greatest distance from and inside the outer edge of the query image;
   counting a first number of pixels constituting the contour;
   counting a second number of pixels constituting the skeleton;
   comparing the ratio of the first number to the second number and a threshold number, the threshold number being determined to indicate that the first number is greater than twice the second number;
   determining that the query image is a closed region type when the ratio of the first number to the second number is less than the predetermined threshold number;
   determining that the query image is of an opened region type when the ratio of the first number to the second number is equal to or greater than the threshold number;
   reading out the image data of the closed region type from the database when the query image is determined to be of closed region type;
   reading out the image data of the opened region type from the database when the query image is determined to be of open region type; and
   determining the image data similar to the query image among the read out images.

2. An apparatus for searching image data representing an image by using a query image, comprising:
   a memory for storing a database storing said image data including information that indicates whether the image is a closed region type or an opened region type;
   a controller executing:
   obtaining a query image data representing the query image;
   an extracting module for extracting information indicative of a shape of a contour of the query image and a shape of a skeleton of the query image, the contour constituting an outer edge of the query image, and the skeleton being located at the greatest distance from and inside the outer edge of the query image;
   counting a first number of pixels constituting the contour;
   counting a second number of pixels constituting the skeleton;
   comparing the ratio of the first number to the second number and a predetermined threshold number, the threshold number being determined to indicate that the first number is greater than twice the second number;

determining that the query image is a closed region type when the ratio of the first number to the second number is less than the predetermined threshold number;

determining that the query image is of an opened region type when the ratio of the first number to the second number is equal to or greater than the threshold number;

reading out the image data of the closed region type from the database when the query image is determined to be of closed region type;

reading out the image data of the opened region type from the database when the query image is determined to be of open region type; and determining the image data similar to the query image among the read out images.

3. A non-transitory computer readable medium for storing a program executed by an apparatus for searching image data representing an image from a database by using a query image, the apparatus executing a process comprising:

obtaining a query image data representing the query image;

extracting information indicative of a shape of a contour of the query image and a shape of a skeleton of the query image, the contour constituting an outer edge of the query image and the skeleton being located at the greatest distance from and inside the outer edge of the query image;

counting a first number of pixels constituting the contour;

counting a second number of pixels constituting the skeleton;

comparing the ratio of the first number to the second number and a predetermined threshold number, the threshold number being determined to indicate that the first number is greater than twice the second number;

determining that the query image is a closed region type when the ratio of the first number to the second number is less than the predetermined threshold number;

determining that the query image is of an opened region type when the ratio of the first number to the second number is equal to or greater than the threshold number;

reading out the image data of the closed region type from the database when the query image is determined to be of closed region type;

reading out the image data of the opened region type from the database when the query image is determined to be of open region type; and determining the image data similar to the query image among the read out images.

* * * * *